United States Patent [19]

Marohn

[11] Patent Number: 4,957,951
[45] Date of Patent: Sep. 18, 1990

[54] PROCESS TO MANUFACTURE A REACTION RESIN CEMENT BUILDING MATERIAL MIXTURE

[76] Inventor: Heinz Marohn, Am Eichenkamp 13, D-4150 Krefeld, Fed. Rep. of Germany

[21] Appl. No.: 880,171

[22] Filed: Jun. 30, 1986

[30] Foreign Application Priority Data

Jul. 1, 1985 [DE] Fed. Rep. of Germany ....... 3523479

[51] Int. Cl.$^5$ .......................... C08K 3/34; C08L 63/00
[52] U.S. Cl. ........................................ 523/401; 524/2; 524/4
[58] Field of Search ....................... 523/401; 524/2, 4; 427/220

[56] References Cited

U.S. PATENT DOCUMENTS 4,758,610  7/1988  Tadashi et al. .......................... 524/2

FOREIGN PATENT DOCUMENTS 2106813  8/1972  Fed. Rep. of Germany ...... 523/401
1002154  8/1985  United Kingdom ................ 523/401

Primary Examiner—Lewis T. Jacobs
Attorney, Agent, or Firm—Eckert Seamans Cherin & Mellot

[57] ABSTRACT

The invention concerns a process to manufacture a building material mixture from a reaction resin, a hardener, cement, an aggregate containing coarser and finer parts and water. To produce a storage stabile, dry premix the coarser parts of at least one partial amount of the aggregate are mixed with the liquid resin or the liquid hardener such, that droplets or films of the resin, resp. hardener can adhesively deposit themselves on the surfaces of the coarsely-grained aggregate, subsequently the finer parts of the aggregate are added, which cover the remaining free surfaces of the droplets, resp. films, or that for the manufacture of a storage stabile, dry mix an amount of liquid resin or hardener is cooled until the amount solidifies, in this state is ground to powder and is mixed with the finest fraction of the aggregate before the powdery resin, resp. hardener again return to its liquid state.

9 Claims, No Drawings

PROCESS TO MANUFACTURE A REACTION RESIN CEMENT BUILDING MATERIAL MIXTURE

The invention refers to a process to manufacture a building material mixture from a reaction resin, especially epoxy resin, with an appropriate hardener cement, to form an aggregate containing rougher and finer parts and water, wherein a first group of individual components, including resin and/or hardener, are mixed in a mixing device to produce a premix. The premixed batch is stored and only later, immediately before its use, the premix and other components are mixed, and a ready-to-use building material mixture is prepared.

In the process for preparing a cement mixture as known from the German Offenlegungsschrift 28 40 874 the individual components are mixed together during the final preparation of the ready-to-use building material mixture, with the epoxy resin used as reaction resin and the hardener being present as emulsions. The resin and hardner may not be mixed with one another nor with the cement before the process of the hardening or setting is to actually take place. It is therefore not possible to produce a premix of cement and either the resin or the hardener, or possibly both, which can be stored.

From the U.S. Pat. No. 3,926,886 an epoxy resin-amine salt emulsion is known, this is a premix of resin and hardener in an emulsion. The hardener is chemically blocked and is activated through the addition of cement. The premix of resin and blocked hardener can be stored for long periods of time, however it is not in dry form and production of a dry premix to which the total required amount of water can be added for the preparation of the building material mixture is not possible. Furthermore salts are used to activate the hardener, which salts remain in the building material and cause problems.

Finally the epoxy resin manufacturers set so-called guide-formulas, which prescribe processes of the type mentioned initially. In one of the guide-formulas EM 86 of a manufacturer, the first pre-mix contains 85 parts by weight in the following: Rutapox VE 3100 SE. Comp. B, 74 parts by weight water, 80 parts by weight Blanc fix N, 95 parts by weight quartz powder W 6, 40 quartz powder W 12, 128 of silica sand 0.1–0.4, 150 of EFA-filler, 10 of titanium dioxyde RN 56 and 6 of modifier KW. The pasty-to-liquid premixes A and B are mixed together in a proportion of mixture of one to two, if a ready-to-use building material mixture is to be prepared, here in the form of an epoxy-emulsion filler.

The disadvantage of the last mentioned building material mixture is its short shelf life, especially of the first premixture. Part of the epoxy resin is in direct contact with part of the cement, whereby long-time-reactions occur. The resin can become inactive in strong alkaline surroundings. The resin can envelop cement granules at least partially and, at a later date it is impossible to remove the coating from the cement. It is possible that the resin can irreversably fuse into the cement granule. Because of the epoxy resin the surface cement granules can become water-repellent so that hydration even after addition of water cannot occur. In total at least part of both bonding agents, i.e., resin and cement, break down, so that after a certain shelf life of the first premix the building material mixture produced with it does not have the same qualities as a building material mix prepared after shorter shelf storage. The water cement value rises from 0.5 after several months of shelf life, for example after one half year of shelf life to a value of 1.0.

The loss of bonding agent can be counteracted in that from the start a higher amount of reaction resin and cement are added. However the price of the building material mixture thereby increases, and the extra used resin/cement particles in the building material mixture cause interference.

An advantage of the building material mixture after preprocessing is the relatively simple manufacture of the building material mixture at the location of application. Two prepared pre-mixes in the correct weight ratio to one another have to be mixed, if a ready-to-use building material mixture is required. For practical requirements at the building site such simplified preparation is advantageous and largely eliminates sources of error when mixing because for the most part, the mixing processes have already been performed by the industrial manufacturer.

Starting with the initially mentioned process it is the object of this invention to avoid the disadvantages of this process and to further develop this process while retaining its advantages, such that the premix is pourable and can be stored over longer periods of time without problems and without losing a noticeable portion of bonding agent. The scale for shelf life of the premix is thereby the shelf life of the cement, especially bags of cement. Dealers and users know that bags of cement can be stored in a dry place for several months without weakening of the cement. The storage quality of at least one premix, possibly both premixes, should be the same. Otherwise there should be as little deviation as possible from the processing sequences for the manufacture of purely hydraulic building material mixtures, for example, the same mixtures. Similar and not harder preparations, etc., should be possible and the critical mixing processes should take place industrially at the manufacture of the pre-mix.

This object is achieved for the manufacture of a storage stable, dry premix wherein at first the coarser shares of at least one partial amount of the aggregate are mixed with the liquid resin or the liquid hardener, such that droplets or films of the resin or hardener can adhesively deposit on surfaces of the granules of the coarse-grained aggregate and subsequently the finer granules of the aggregate are added and the free surfaces of the deposited droplets or films are covered, especially powdered.

The premix manufactured in accordance with this process is completely dry and stable during storage. It can be stored just like cement and does not require more care than storage of cement packed into bags. It can be used in a mixing process, the same as regular dry mixes. The resin and hardener are distributed very evenly in the aggregate. The aggregate protects the individual very small liquid droplets or films from one another. For the later mixture resin and hardener are thereby already in a most favorable, extremely dispersed position in the aggregate, which of course usually makes up the largest volume share of ready-to-use building material mixture. During the mixing process to finally manufacture the ready-to-use building material mixture, sufficient mixing of resin and hardener is no longer a problem, this mixing is already done by the manufacturing process of the pre-mix. The preparation of the premix is performed under completely dry bonding. Practically the complete amount of water required for the manufacture of the ready-to-use building material is added when the building material mixture is finally produced. When water is added the liquid resin and hardener particles are freed from the granules of the aggregate and emulsify.

The premix is relatively simple and can be manufactured in presently existing systems. During manufacture the mixing processes are performed such that the fluid particles absorbed on the granule surfaces are not removed by the mixing process. Therefore already enveloped liquid particles do not break up and are not released. On the other hand the mixing process is performed such that the liquid inserted, i.e., resin or hardener, is distributed as much as possible and is split into such small units that during the filling and pouring processes the encapsulated units remain intact. The separation of the liquid resin and/or liquid hardener can take place through the mixing process. These liquids can however also be finely distributed into a mixer.

On the other hand the invention's objects are achieved in that for the manufacture of a storage stable, dry premix an amount of liquid resin or hardener is cooled until the amount solidifies into a solid state
is ground into powder in this condition and
is mixed with the finest fraction of the aggregate before the powdered hardener can return to liquid.

The pre-mix manufactured in accordance with this process is also pourable, dry and has a long shelf life, it has the same long storage stability characteristics as the premix described above. Through the pulverzing grinding process the resin and/or hardener are thus split into the smallest particles. Because the pulverizing aggregate, for example in form of talcum or silicagel, are mixed with the still firm resin in the form of powder (and/or hardener in the form of powder), a solid mixture is obtained. If thereby or later the powdery resin or hardener particles become again liquid, they are surrounded by pulverant aggregate and thereby remain separated from one another. This separation is kept over a long period of time.

On the interface between liquid resin, or hardener and aggregate an adhesive, physical connection occurs, which is dissolved upon addition of water. The mixing process for the manufacture of the premix has to be performed such that the casing of the pulverant aggregate material enveloping the liquid particles cannot be broken open or be destroyed. The premix manufactured such has the advantage of requiring only very little room. The volume of the components determining the later volume of the ready-to-use building material mixture, especially the average and rough particles of the aggregate, are only added at the construction site and can therefore be purchased locally.

Both solutions have in common that the actual user at the construction site does not require additional mixing devices and the operating sequences practiced to date for the manufacture of purely hydraulic building material mixture can practically remain unchanged.

Because the liquid resin and/or hardener particles are enveloped by aggregate, i.e., in a certain sense surrounded by a casing, it is possible to initially add cement to a dry premix manufactured as such. The cement granules are separated from the liquid droplets by the barrier of the aggregate granules, so that a high storage stability is achieved. The mixing process at the construction site—namely during the final manufacture of the ready-to-use building material mix—is thereby simplified.

The addition of cement to the premix has the advantage that the cement portion, which especially effects the quality of the concrete, is predetermined. One is able to add cement to the ready-to-mix building material mixture to achieve a higher grade building material mixture, but when adding cement carefully be considered that the premix already contains a certain amount of cement.

The process includes preparing two dry premixes, premix A having resin and part of the aggregate, and premix B having hardener and the rest of the aggregate. This has the special advantage that the exactly measured mixture with correct amounts of hardener and resin already exists in the premix. At the construction site, upon final manufacture of the ready-to-use building material mixture, attention does not have to be paid to the fact that the correct amount of dry premix A and the correct amount of dry premix B are used. A practical one component building material is obtained at which resin and hardener in the right amount of admix are already closely near one another, but are permanently separated from one another by the casings of aggregate granules. If cement is added to such a premix, then upon the manufacture of a ready-to-mix building material mixture it is only necessary to add water. Such a dry-mix can be treated—at the construction sites or at building material dealers—the same as the usual ready-to-use building materials, for example: ready-to-use dry mortar, also stored, prepared and processed the same way.

If one does not wish to mix the premix A containing the resin and the premix B containing the hardener into a dry premix, it is advantageous to arrange the volumes of the premixes such that in a volume of the premix B only so much hardener is contained as is required for the mixture of both volumes of the same size for a complete resin-hardener-reaction. At the construction site equal amounts of premix A and premix B are placed into a mixture, in order to be able to prepare a ready-to-use building material mix by adding the residual components. It is also possible to measure proportions volumetrically. As regards packaging this also has the advantage that both premixes can be filled and stored in one bag, separated by a thin wall, for example: aluminum foil. They are separated from one another, however when the bag is opened and emptied they empty together into a mixer.

It is advantageous if the aggregate has inert granule surfaces, which do not allow diffusion of the resin or hardener into the granular volume. It is thereby avoided that resin or hardener are lost. Silica sand for example has inert granular surfaces.

It is extremely advantageous to mix an emulsifying agent, for example: Lauryl alcohol, to the resin, or the hardener before enveloping it by the aggregate granules. This simplifies and secures separation of the liquid resin or hardener droplets from the aggregate granules, so that the complete amount of resin and hardener is always released from the aggregate granules. It is also favorable for the separation, that during the final manufacture of the ready-to-use building material mixture a filler material is added, which is slightly acidic in the suspension, which for example has a pH-value of 5 to 6.9.

The invention is explained below with a few examples:

EXAMPLE 1 (FILLER)

60 kg of dried silica aggregate with the granulation 0.2 to 0.6 are prepared in a construction site mixer, for example Zyklos, and while the mixing device operates 1.65 kg epoxy resin (bisphenol A or F, 166 AS15) equivalent weight 180 to 200 are added. Through driven mixing the epoxy resin is absorbed evenly by the individual aggregate granules. Subsequently 10 kg quartz powder, granulation 0.2 to 0.6 millimeter are also added while the mixer is operating to powder the free resin surfaces and to free them from adhesive. To conclude the mixing process 30 kg of cement, for example PZ 35 F are added.

The result is a premix A, which can be stored for long periods of time, to which at the construction site—besides mixing water—only an epoxy-resin hardener, for example 1.65 kg water emulsive polyamino, equivalent weight 180 to 200 has to be added.

Mixing devices with low or maximum average speed of rotation, for example 200 rotations per minute, are used. The shear forces occurring thereby absorb the resin (or in another version the hardener) in even layers into the aggregate granules. Higher speeds of rotation and thereby also higher energies work the resin or the hardener into the filler material or remove it from it, so that it cannot be separated so favorably and during the manufacture of the building material mixture is immediately available, as is required. The resin can also be broken into pieces, but especially the aggregate materials can be divided finely.

The mixing sequence is also of great importance for the finished quality. It is very advantageous to lay out the coarse aggregate material in a line onto which the resin or the hardener is placed. Subsequently the next finer fraction is added to coat the free resin surfaces with powder and to make them non-adhesive. The cement and/or the hydraulic binding agents are to be placed into the dry mixture obtained thus only if the resin or (the hardener) are largely powder coated. A diffusion of the resin components or (hardener) into the cement is thereby prevented, as has been accomplished above. Even after several months of storage the water cement value of the manufactured building material components still remained at 0.5.

EXAMPLE 2 (MORTAR)

Dried aggregate material of individual granules, cement and epoxy resin are mixed as follows:

50 kg dried silica sand with a granulation of 1 to 4 mm are placed into a mixer, number of revolutions 200 RPM and the 1.2 kg epoxy resin, equivalent weight 180 to 200 are added. After homogeneous mixing the following are added in sequence: 10 kg granulation 0.5 to 1.2 mm, 1.5 kg granulation 0.2 to 0.63 mm (beach sand) and subsequently 25 kg cement, for example PZ 45.

The result is a premix A with long shelf life, which can be supplied in bags. The hardener formula, for example 1.25 kg polyamine, equivalent weight 180 to 200 is added at the construction site with the mixing water.

EXAMPLE 3

According to example 1 or 2 the premix A is mixed with the following premix B:

250 grams of a finely precipitated silicic acid are prepared with 1 kg polyamine with an approx. equivalent weight of 200, which has been heated to 80° and added in a thin stream, while the mixer is operating. After a mixing time of approx. 10 minutes the mixture has been mixed, so that it is pourable and stores well.

The premix B obtained such is mixed with the already described premix A, the obtained, very well storable, dry building material requires for its hardening and bonding solely the mixing water required for the cement.

Mixing at the construction site is thereby unnecessary. The contents of finely precipitated silicic acid effects good, non-sag properties on vertical surfaces, at suitable screen-adjustment also for joints.

As extensive tests and storage tests show, it is of extreme importance for the manufacture of a storable epoxy-resin-cement preparation, that a diffusion of the epoxy resin or the hardener into the cement be avoided. Even the direct contact of the epoxy resin with the cement is critical at storage times of more than 6 months. If the preparation of a premix or the dry mix is controlled such that during manufacture the epoxy resin can come into direct contact with the cement, a diffusion of the epoxy resin into the cement can be expected, and the resin continues to oxidize. Through this effect, which takes place over a period of several months, a reaction partner for the hardener is lost. Reference has already been made to the water (moisture) repellent finish of the cement granule. If only water is added to such a mix, decreased hydration of the cement (or no hydration) occurs and no hardening. At simultaneous addition of the epoxy resin hardener occurs slight hardening occurs, it is however incomplete and can be judged only as insufficient.

If a partial contact between epoxy resin and cement takes place, a polymerization of the epoxy resin take place through the simultaneous influence of humidity (of the air) and oxygen. The usual types of packaging for regular dry building material do not allow exclusion of humidity, which effects a slight alkaline reaction with the cement, which then—through the oxygen influence triggers a catalytic cross linkage of the epoxy resin. If only mixing water is added to such a mixture, processing through cross linkage and thereby very high viscosity of the epoxy resin is not possible anymore.

If the correspondingly measured amount of a watery polyamine is added to the mixing water, hardening takes place only very incomplete, as because of the continued crosslinkage of the resin, a very large and usually uncontrollable excess amount of polyamine is at hand. Even if the largest formula is used in a mixer, which infuses great energy into the materials, for example: a plowshare mixer with cutters, it is not possible to produce a product with storage stability. The reason for this being that through the high energy infusion the cement and the epoxy resin are brought into such strong contact, that a continued reaction, such as has been described above, takes place.

The decisive factor is that at the building material mixture of this invention the cement remains the primary bonding agent, for example on 5 to 20 weight percent, preferably 12 weight percent of epoxy resin and hardener, referred to the bonding agent cement are used. Furthermore a resin/hardener system is used, which hardens slower than the cement requires for its bonding process. The resin therefore does not interfere with development of the actual cement bond.

I claim:

1. A process for the manufacture of a building material from reaction materials in the form of a storage stable premix which comprises:

preparing a dry premix (A) by first coating aggregate material with a liquid epoxy resin by mixing said resin with said aggregate material under conditions such that the epoxy resin is deposited on and adhered to the surface of the aggregate;

coating the resulting epoxy coated aggregate with a pulverized aggregate powder thereby covering the epoxy coated aggregate;

preparing a dry mix (B) by coating aggregate material with an epoxy resin hardener such that a film of the hardener is deposited on and adhered to the surface of the aggregate material and then coating the resultant hardener coated aggregate with a pulverized aggregate powder whereby a covering film is formed over the epoxy resin hardener coated aggregate; and, mixing premix (A) with premix (B) to form said building material.

2. In a process for the manufacture of a building material from reaction materials including an epoxy resin component and an epoxy resin hardener component and aggregate, the improvement which comprises:

utilizing a premix component formed by cooling either a liquid epoxy resin or a liquid epoxy resin hardener or both separately until solid;

grinding either of said resultant solidified epoxy resin or solidified epoxy resin hardener or both to a powder; and, contacting the resultant epoxy resin powder or epoxy resin hardener powder, or both, with pulverized aggregate for forming a coating over said epoxy resin or epoxy resin hardener or both.

3. The process of claim 1 further comprising adding and mixing cement with the coated epoxy resin powder in premix A or coated epoxy resin hardener in premix B.

4. The process of claim 1, wherein proportions of the resin and the hardener and proportions of the aggregate respectively contained in premix A and premix B are chosen such that equal volumes of premix A and premix B produce a complete resin and hardener reaction when mixing both volumes.

5. The process of claim 1, wherein said mixing is accomplished with an aggregate having granules with inert surfaces, whereby the reaction material is not diffused into the aggregate.

6. The process of claim 1, further comprising the step of adding an emulsifying agent prior to mixing said epoxy resin or epoxy resin hardener with the aggregate.

7. The process of claim 1, wherein the epoxy resin and epoxy resin hardener are mixed at a weight percent of 5 to 20 weight percent of said mixture.

8. The process of claim 1, wherein the resin is bisphenol A epoxy resin.

9. The process of claim 7, further comprising the step of adding cement to the mixture, and wherein the cement comprises approximately 12 weight percent of the mixture.

* * * * *